L. E. McHUGH.
STUFFING CONTAINER.
APPLICATION FILED APR. 3, 1920.

1,403,045.

Patented Jan. 10, 1922.

Inventor
L. E. McHugh.

Witness

UNITED STATES PATENT OFFICE.

LAWRENCE E. McHUGH, OF DUBOIS, PENNSYLVANIA.

STUFFING CONTAINER.

1,403,045.   Specification of Letters Patent.   Patented Jan. 10, 1922.

Application filed April 3, 1920. Serial No. 371,101.

*To all whom it may concern:*

Be it known that I, LAWRENCE E. Mc-HUGH, a citizen of the United States residing at Dubois, in the county of Clearfield and State of Pennsylvania, have invented a new and useful Stuffing Container, of which the following is a specification.

It is the object of this invention to provide a container adapted to hold material of the sort which enters into the make-up of stuffing or filling, the container being so constructed that it can be placed in a baking pan or other utensil thereby providing a quantity of stuffing when the article which is being baked is of such a nature that it cannot contain stuffing, or when an additional quantity of stuffing is required.

Specifically, the invention aims to provide a stuffing container which will be strong at its ends, so as to withstand the expansion of the stuffing, and to provide a container, the body portion of which will be spaced from the bottom of the baking pan, so that one part of the stuffing in the container will not become sodden with grease from the pan, the construction being such, further that the stuffing will not be likely to burn.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
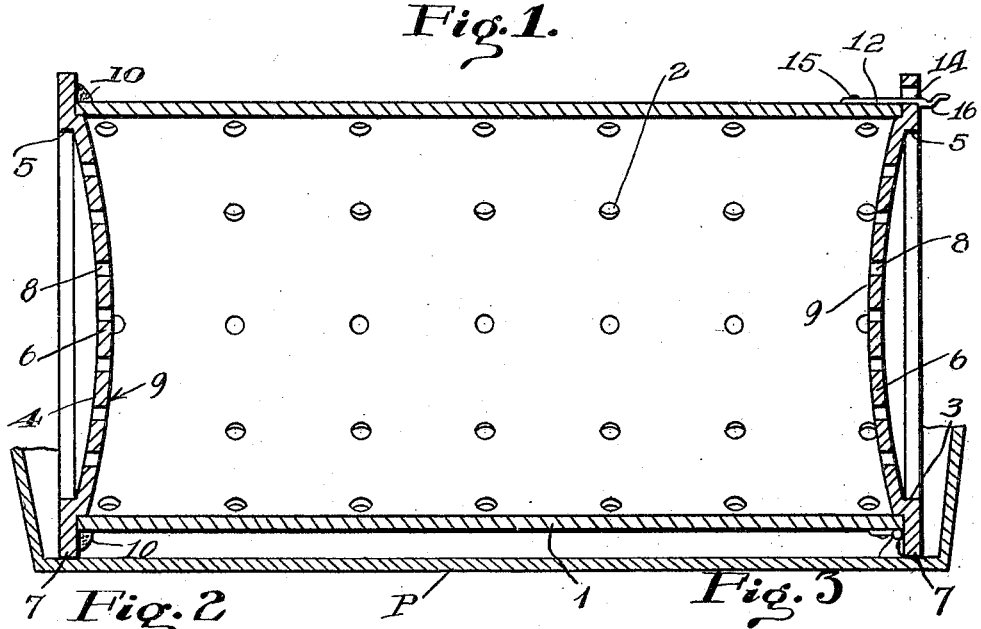
Figure 2:
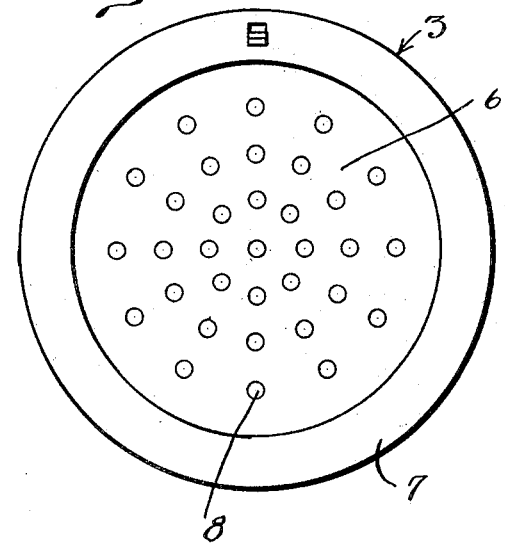
Figure 3:
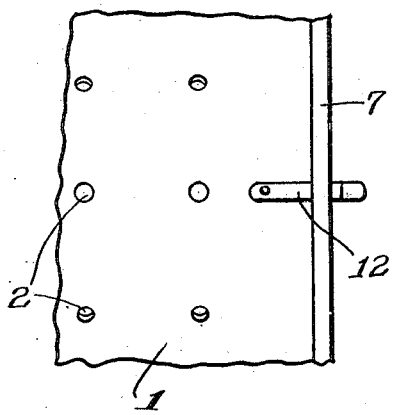

Figure 1 shows in longitudinal section, a stuffing container constructed in accordance with the invention; Figure 2 is an end elevation of the container; and Figure 3 is a fragmental side elevation.

The device forming the subject matter of this application preferably is made from metal throughout and includes a tubular body 1 having any desired number of perforations 2. Closures 3 and 4 are provided, the closures being inset, as shown at 5, to form cup-shaped extensions 6 received within the ends of the tubular body 1. The closures project peripherally beyond the body 1 and define flanges 7. The parts 6 of the closures are supplied with perforations 8. The members 6 of the closures are convexed inwardly, as shown at 9. The closure 4 is held permanently on the body 1 in any desired way, preferably through the instrumentality of solder 10 located in the angle defined by the flange 7 of the closure 4 and the body 1. A hinge 11 connects the flange 7 of the closure 3 with the body 1 and is located in the angle formed by the said parts. The flange 7 of the closure 3 is provided with an opening 14. A latch 12 projects through the opening 14 and is secured as indicated at 15, adjacent one end, to the body 1, the latch having a shoulder 16 adapted to engage the flange 7 of the closure 3.

It will be obvious that the closure 3 may be swung to an open position on the hinge 11 to permit the body 1 to be filled with stuffing, and to permit the stuffing to be removed. Since the flanges 7 project beyond the body 1, the body 1 is spaced from the bottom of the baking pan. Consequently, the stuffing in the body 1 will not be burned adjacent to the bottom of the device, nor will the lower portion of the stuffing in the body dip into the grease or gravy in the pan and become sodden. Since the cup-shaped extensions 6 of the closures 3 and 4 are convexed inwardly as shown at 9, they will withstand the expansion of the stuffing. Further, because the closures 3 and 4 are bulged inwardly as shown at 9, the device may be set up endwise, and the liquid or grease in the stuffing can drain out in a way not possible if the closures 3 and 4 were flat.

The container may be filled with waste scraps of bread or the like and be placed in a baking pan P, thereby making use of material which would be thrown away otherwise and rendering it possible to have a supply of stuffing with a meat, not adapted to contain stuffing.

Having thus described the invention, what is claimed is:—

A stuffing container adapted to be placed in a baking pan or like utensil, and comprising a perforated tubular body; and closures inset to form cup-shaped extensions received within the ends of the body, the closures projecting peripherally beyond the body to define supporting flanges which serve to space the body from the bottom of the pan wherewith the container is used, the closures being convexed inwardly, and being perforated.

In testimony that I claim the foregoing as my own, I have hereto affixed my signature in the presence of two witnesses.

LAWRENCE E. McHUGH.

Witnesses:
JOSEPH C. STERLING,
R. F. VASBINDER.